United States Patent
Voss et al.

[19]

[11] Patent Number: 6,106,964

[45] Date of Patent: Aug. 22, 2000

[54] SOLID POLYMER FUEL CELL SYSTEM AND METHOD FOR HUMIDIFYING AND ADJUSTING THE TEMPERATURE OF A REACTANT STREAM

[75] Inventors: Henry H. Voss, West Vancouver; Russell H. Barton, New Westminster; Brian W. Wells; Joel A. Ronne, both of Vancouver, all of Canada; Harald Anton Nigsch, Weingarten, Germany

[73] Assignee: Ballard Power Systems Inc., Burnaby, Canada

[21] Appl. No.: 09/108,156

[22] Filed: Jun. 30, 1998

Related U.S. Application Data

[60] Provisional application No. 60/051,356, Jun. 30, 1997.

[51] Int. Cl.$^7$ .............................. H01M 8/18; H01M 8/00; H01M 8/04
[52] U.S. Cl. .............................. 429/20; 429/13; 429/19; 429/26
[58] Field of Search .................. 429/13, 19, 20, 429/26, 33, 34

[56] References Cited

U.S. PATENT DOCUMENTS

| | | | |
|---|---|---|---|
| 3,494,174 | 2/1970 | Green et al. ............................... | 73/23.1 |
| 4,973,530 | 11/1990 | Vanderborgh et al. .................... | 429/13 |
| 5,200,278 | 4/1993 | Watkins et al. ............................ | 429/24 |
| 5,382,478 | 1/1995 | Chow et al. ................................ | 429/26 |
| 5,432,020 | 7/1995 | Fleck ......................................... | 429/13 |
| 5,436,086 | 7/1995 | Seymour et al. .......................... | 429/17 |
| 5,543,238 | 8/1996 | Strasser ..................................... | 429/17 |
| 5,547,776 | 8/1996 | Fletcher et al. ............................ | 429/13 |
| 5,776,625 | 7/1998 | Kaufman et al. .......................... | 429/30 |

FOREIGN PATENT DOCUMENTS

| | | |
|---|---|---|
| 8-138705 | 5/1996 | Japan . |
| WO 96/24958 | 8/1996 | WIPO . |
| WO 99/67829 | 12/1999 | WIPO . |

OTHER PUBLICATIONS

Masayasu, JP—09–055218—"Fuel Cell Gas Humidifying System and Gas Humidifying Method," (Jan. 2, 1997) Abstract Only.

JP–07–176313—"Fuel battery system—uses reproduction heat exchanger to supply pure water for air humidification," Abstract Only Jul. 14, 1995.

*Primary Examiner*—Kathryn Gorgos
*Assistant Examiner*—Edna Wong
*Attorney, Agent, or Firm*—McAndrews, Held & Malloy, Ltd.

[57] ABSTRACT

Reactant gas supply streams for solid polymer fuel cells may be heated and humidified using heat generated by the fuel cell and water vapor from the fuel cell exhaust. The heat and water vapor in the oxidant exhaust stream are sufficient to heat and humidify a reactant gas supply stream, preferably the oxidant supply stream. The heating and humidifying can be accomplished by flowing a reactant gas supply stream and a fuel cell exhaust gas stream on opposite sides of a water permeable membrane in a combined heat and humidity exchange apparatus. The method and apparatus are particularly suitable for use with air-cooled fuel cell systems and systems which employ near ambient pressure air as the oxidant gas supply.

10 Claims, 5 Drawing Sheets

SOLID POLYMER FUEL CELL SYSTEM AND METHOD FOR HUMIDIFYING AND ADJUSTING THE TEMPERATURE OF A REACTANT STREAM

CROSS-REFERENCE TO RELATED APPLICATION

This application is related to and claims priority benefits from benefit of U.S. Provisional Patent Application Ser. No. 60/051,356, filed Jun. 30, 1997, entitled "Method And Apparatus For Humidifying And Adjusting The Temperature Of A Reactant Stream For A Solid Polymer Fuel Cell" which is incorporated by reference herein in its entirety.

FIELD OF THE INVENTION

The present invention relates to a solid polymer fuel cell system and a method for humidifying and adjusting the temperature of a reactant gas stream therefor. More particularly, the invention relates to a fuel cell system and method in which heat generated by the fuel cell and water vapor in a reactant stream exhausted from a fuel cell are used to heat and humidify a reactant gas stream prior to introduction into the fuel cell. The invention is particularly suitable for air-cooled fuel cell systems or systems which employ near ambient pressure air as the oxidant gas supply.

BACKGROUND OF THE INVENTION

In solid polymer fuel cells which employ an ion exchange membrane (typically a proton exchange membrane) as the electrolyte, the water content of the membrane affects the performance of the fuel cell. The ion conductivity of the membrane generally increases as the water content or hydration of the membrane increases, therefore it is desirable to maintain a sufficiently high level of hydration in the membrane during fuel cell operation. For this reason, the reactant streams are typically humidified prior to introduction into electrochemically active regions of the fuel cell.

The capacity of reactant gases to absorb water vapor varies significantly with changes in temperature and pressure. Therefore, it is preferred to humidify the reactant gas streams at or as near as possible to the operating temperature and pressure within the fuel cell. If the reactant gas is humidified at a temperature higher than the fuel cell operating temperature this can result in condensation of liquid water occurring when the humidified reactant gas enters the fuel cell. Condensation may cause flooding in the electrodes which may detrimentally affect fuel cell performance. Conversely, if the reactant gas stream is humidified at a temperature lower than the fuel cell operating temperature, the reduced water vapor content in the reactant gas stream could result in membrane dehydration and damage to the membrane. Thus, the reactant streams are often heated and humidified prior to introduction into the fuel cell.

Various approaches have been used to increase the humidity of reactant gas streams supplied to fuel cells. For example, some conventional solid polymer fuel cell systems humidify a reactant gas stream by flowing the reactant gas stream and liquid water on the opposite sides of a water-permeable membrane. Water from the liquid stream is transferred through the membrane, thereby humidifying the reactant gas stream. The pressure, temperature, flow rates and path length through the liquid water-to-gas humidifier can be adjusted to give the desired water vapor content in the reactant stream. The water is preferably de-ionized to prevent ionic contamination of the fuel cell membrane electrolyte.

For example, U.S. Pat. No. 5,547,776 discloses a fuel cell system which includes a membrane humidifier for a reactant gas stream with the humidifier preferably using de-ionized liquid water.

Such liquid water-to-gas humidifiers are commonly used in solid polymer fuel cell systems in which water is used as a cooling fluid, as the cooling water is a convenient source of water for the humidifier. Japanese Patent Publication No. 09-055218, for instance, teaches membrane humidification of the reactant gas supply stream using the warm water of the liquid coolant. The humidifier employed may be a separate module in the solid polymer fuel cell system. Alternatively, it may be incorporated as an assembly in the fuel cell stack itself, such as between the end plates of fuel cell stack. U.S. Pat. No. 5,382,478 discloses such an assembly in the fuel cell stack wherein a liquid water-gas humidification section is located upstream of the electrochemically active section of the fuel cell. U.S. Pat. No. 4,973,530 shows another embodiment comprising a liquid water-gas humidification section. In fact, the humidification section can be even more closely associated with the electrochemically active section of the fuel cell stack. For instance, PCT International Publication No. WO 96/24958 shows that humidification sections can be created by leaving portions of the electrode surfaces uncoated with catalyst. Thus, humidification of the anode stream by the cathode stream can occur across the membrane electrolyte material in these areas. However, these uncoated portions are not electrochemically active and thus represent inefficient use of electrode and polymer electrolyte membrane surface area.

The reactant streams exiting the fuel cell or fuel cell stack typically contain product water, as well as water vapor which was present in the humidified stream delivered to the fuel cell. In particular, the oxidant stream, as it travels through a fuel cell, absorbs water that is produced as the product of the electrochemical reaction at the cathode.

In some fuel cell systems, the product water from the fuel cell is condensed from the exhaust reactant streams and is collected and then used for reactant stream humidification and/or cooling of the fuel cell. In such systems, the water in the exhaust streams is typically collected in the liquid phase and is generally combined with a larger liquid cooling water supply as shown, for instance, in U.S. Pat. No. 5,200,278.

Other conventional approaches for humidification of reactant gas streams prior to introduction into fuel cells include the injection of water vapor or atomized water droplets into the reactant streams (as shown, for instance, in U.S. Pat. No. 5,432,020), and exposing a reactant gas stream directly to water in an evaporation chamber to permit the stream to absorb evaporated water. Japanese Patent Publication No. 07-176313 shows a fuel cell system where pure water is used to humidify the reactant gas supply streams and where the oxidant stream exhaust is used to heat the incoming oxidant reactant gas stream in a heat exchanger.

Solid polymer fuel cell systems are typically liquid-cooled rather than air-cooled if higher power densities (power output capability per unit volume) are required. The reason is that their cooling systems must shed a significant amount of heat at relatively low temperature (circa 80° C.) with respect to ambient temperature . In addition, the use of liquid—as opposed to air-cooling allows the fuel cell stack cooling channels to be made smaller and hence a lower overall stack volume can be obtained. However, air-cooled fuel cell systems may be preferred in many applications where power density is less important. However, for humidification purposes, such air-cooled systems cannot rely on the coolant as a supply of water.

It is well known that transport across a semi-permeable membrane is substantially more efficient from the liquid phase than from the gas phase. Nonetheless, it is also well known that a significant, but lesser, transfer of species can take place across a suitable semi-permeable membrane, from the gas phase, even against an absolute pressure differential, as long as there is a significant partial pressure difference of the species across the membrane. For instance, U.S. Pat. No. 3,494,174 discloses a semi-permeable membrane exchange apparatus for transferring species from one gas stream to another, against an absolute pressure difference, for use in gas chromatographs. However, predominantly gas—gas phase membrane exchange humidifiers have generally not been contemplated for use in humidifying the reactant gas supply streams of fuel cells. Presumably, the heating and humidity requirements for fuel cell reactant gas supply streams were not viewed as achievable in gas—gas humidifiers.

In fuel cell systems which employ conventional reactant gas supply humidifiers, the desired heating of the supply stream may be accomplished simultaneously with the humidifying. For instance, heat is exchanged across the membrane in any liquid water-gas membrane humidifier supplied with warm liquid water from the circulating coolant.

Sometimes it is not necessary to use a humidifier to introduce water vapor into both the oxidant and fuel reactant streams. In systems in which the reactant gas is partially or fully recirculated through the fuel cell stack, it may not be necessary to humidify the additional fresh gas stream which is also supplied, if the product water carried back to the inlet by the recycled stream is sufficient to maintain adequate hydration of the ion exchange membrane. U.S. Pat. No. 5,543,238 illustrates partial recirculation of the fuel cell exhaust gas to heat and humidify the incoming reactant stream. Additional apparatus for performing the recirculation is necessary however. In direct methanol fuel cells, the methanol fuel stream may be supplied as a dilute aqueous solution in which case further humidification of the fuel stream is not required. Similarly hydrogen-containing reformate streams (obtained, for example, by reforming a fuel such as methanol, natural gas or butane), which may be supplied as the fuel stream to a fuel cell, typically contain sufficient residual water vapor from the reforming process.

While many varied fuel cell systems appear in the art, typically at least the oxidant gas supply stream is humidified and heated prior to introduction into a fuel cell. The required humidification and heating apparatus typically adds to the complexity of the fuel cell system, as it generally includes additional system components, such as a humidification water pump, piping, water reservoir and filtration unit, in addition to the humidification module and heater. It can also add to the parasitic load of the system as power is required for operating pumps and heating the stream.

Accordingly, a simpler and more energy efficient means for pre-heating and humidifying reactant supply streams in a solid polymer fuel cell systems is desirable.

SUMMARY OF THE INVENTION

In the present method for humidifying and adjusting the temperature of a reactant gas stream supplied to a solid polymer fuel cell, an exhaust reactant stream from a fuel cell is used to heat and humidify a reactant stream supplied to the fuel cell. The method is particularly suitable for use in conjunction with a fuel cell in which the electrochemical reaction is exothermic and produces water. In this case, exhaust reactant streams exiting the fuel cell will typically be warmer and have a higher partial pressure of water vapor than the supply reactant streams.

The reactant gas supply streams for a solid polymer fuel cell include a fuel supply stream and an oxidant supply stream that are supplied to fuel and oxidant inlet ports of the fuel cell respectively. The solid polymer fuel cell also typically has both a fuel exhaust stream and an oxidant exhaust stream exiting the fuel cell via fuel and oxidant exhaust ports, however one of the reactants may be essentially dead-ended with optional intermittent venting of inert components. A method for heating and humidifying a reactant gas supply stream for the fuel cell then consists essentially of:

a) providing a combined heat and humidity exchanger comprising a supply stream chamber, an exhaust stream chamber, and a water permeable membrane separating the two chambers;
 b) directing the reactant gas supply stream through the supply stream chamber upstream of the fuel cell reactant gas inlet port; and
 c) directing the reactant gas exhaust stream from the reactant gas exhaust port through the exhaust stream chamber whereby water and heat are transferred from the reactant gas exhaust stream to the reactant gas supply stream across the water permeable membrane. The reactant supply stream is thus heated and humidified before entering the fuel cell.

Preferably, the oxidant supply stream is the reactant gas supply stream which is heated and humidified. (Indeed, in certain fuel cell systems, the fuel supply stream is not humidified at all.) The method is particularly suitable for fuel cell systems which employ near ambient pressure air (i.e. below about 300 mbar pressure) as the oxidant gas supply. As no liquid water supply is needed for humidifying the reactant gas supply stream, the method is also particularly suitable for fuel cell systems which are air-cooled.

Further, the exhaust stream preferably used to heat and humidify the reactant gas supply stream is the oxidant exhaust stream. Thus, a preferred embodiment involves heating and humidifying the oxidant supply stream using the oxidant exhaust stream. In such an embodiment, it may be desirable to set the flow rate of the oxidant supply stream in the range of from about 6 to 90 L/minute in order to obtain efficient transfer of water vapor and heat across the water permeable membrane.

Generally, in order to obtain efficient transfer of water vapor and heat from an exhaust stream to the supply stream across the water permeable membrane, it is desirable to direct these streams on opposite sides of the membrane in a counterflow configuration. Further, it is desirable to employ other design features in the combined heat and humidity exchanger construction and to set the relevant system operating parameters, including the flow rates of the selected reactant gas supply stream and exhaust stream, such that the transfer of water vapor and heat is generally more efficient.

A dimensionless parameter, herein denoted as R, may be useful in selecting design features and operating parameters for efficient water vapor and heat transfer. R is defined as the residence time to diffusion time ratio for a water molecule in a chamber in a combined heat and humidity exchanger or CHHE. Herein, the diffusion time is defined as the time it takes for a water molecule to diffuse over the depth of a given chamber to the membrane in the CHHE. The residence time is the mean time that a water molecule spends in a given chamber. Empirically, it has been found that R is preferably in the range from about 0.75 to 3 for water molecules in either the supply stream or exhaust stream chambers. Preferably R is in this range for water molecules in both chambers.

A solid polymer fuel cell system includes a solid polymer fuel cell and apparatus for heating and humidifying a reactant gas supply stream. The reactant gas supply stream can be either a fuel supply stream or an oxidant supply stream of the fuel cell. The fuel and oxidant supplies are fluidly connected to fuel and oxidant inlet ports of the fuel cell respectively. The fuel cell system also has at least one reactant gas exhaust port. An apparatus for heating and humidifying the reactant gas stream is a combined heat and humidity exchanger, CHHE, consisting essentially of:

a) a supply stream chamber having an inlet and outlet wherein the reactant gas supply is fluidly connected to the supply stream chamber inlet, and the supply stream chamber outlet is fluidly connected to a reactant gas inlet port of the fuel cell;

b) an exhaust stream chamber having an inlet and outlet wherein a reactant gas exhaust port of the fuel cell is fluidly connected to the exhaust stream chamber inlet; and c) a water permeable membrane separating the supply stream chamber and the exhaust stream chamber whereby water and heat can be transferred from a reactant gas exhaust stream to the reactant gas supply stream across the water permeable membrane.

As above, the reactant gas supply stream in a preferred solid polymer fuel cell system is the oxidant supply stream and the oxidant exhaust stream is the preferred reactant gas exhaust stream. Thus, the system is configured so that in operation the oxidant supply stream is heated and humidified by its own exhaust.

The basic construction of a CHHE can be conventional. The water permeable membrane therein has oppositely facing major surfaces, and the reactant gas to be supplied to the solid polymer fuel cell is directed in contact with one surface of the membrane while simultaneously the desired exhaust stream from the fuel cell is directed in contact with the opposite surface of the membrane. Preferably, the streams are directed on opposite sides of the membrane in a counterflow configuration. Prior to contacting the membrane, the reactant gas supply stream has a lower temperature and a lower partial pressure of water vapor than the exhaust reactant gas stream. Water and heat are transferred through the membrane from the exhaust reactant gas stream to the supply reactant gas stream.

Preferably the membrane is impermeable to the reactant, and more preferably is substantially gas impermeable. This prevents reactant portions of the supply and exhaust streams from intermixing. Suitable membrane materials include cellophane and perfluorosulfonic acid membranes such as NAFION® perfluorosulfonic acid membrane (NAFION® is a registered trademark of DuPont).

The CHHE is preferably external to the solid polymer fuel cell and may comprise multiple supply chambers and/or exhaust chambers. The supply reactant stream may be directed through the supply chambers in parallel or in series, and the exhaust reactant stream may directed through the exhaust chambers in parallel or in series.

A CHHE may be connected to a fuel cell stack, or may be connected to a single fuel cell or a plurality of fuel cells. Preferably the CHHE is of a plate-and-frame type or a multiple plate-and-frame design, although other structures, such as, for example, a jelly-roll configuration or tube bundle configuration may be used.

In a preferred embodiment of the invention, a separately housed modular CHHE is used that can also optionally be installed in direct thermal contact with a fuel cell stack. In this way, the CHHE also benefits from the heat produced by the fuel cells in the stack. Preferably the CHHE contacts and can receive heat from each fuel cell in the stack. If a CHHE is installed as a module, detachably connected to the stack, it can be easily removed and replaced if servicing is required, without disassembling the fuel cell stack. In another generally less preferable embodiment, a CHHE may be incorporated between the end plates (but not between the bus plates) of the fuel cell stack.

As mentioned above, certain design features of a CHHE are advantageous insofar as water vapor transfer and also heat transfer efficiency are concerned. For instance, a CHHE can comprise flow channels for the supply and exhaust streams. It can be advantageous for the depth of the channels in either the supply stream chamber or the exhaust stream chamber to be in the range from 0.05 to 0.25 centimeters (0.02 to 0.1 inches). A perfluorosulfonic acid membrane about 0.018 cm (about 0.007 inches) thick is a suitable water permeable membrane for a CHHE.

In the embodiments described above, the reactant gas supply and exhaust stream may be an oxidant stream, such as for example an oxygen-containing gas stream, most preferably air, or may be a fuel stream, such as for example a hydrogen-containing gas stream. In preferred embodiments the heat-and humidity exchanger is used for gaseous oxidant streams, and a CHHE is used to humidify and adjust the temperature of an air stream supplied to a solid polymer fuel cell.

Thus, it is possible to exclusively use an exhaust stream from a solid polymer fuel cell to heat and humidify a reactant stream supplied to the fuel cell via a membrane exchange apparatus, without the need to condense and collect water from the stream for subsequent use for humidification. As described above, an exhaust stream, which has been heated during its passage through the fuel cell may be used to heat the supply reactant gas stream. Optionally, heat generated by the fuel cell is also used to directly heat the reactant supply stream before it enters the fuel cell. Thus, the heat and water vapor generated by the exothermic reaction in the fuel cell is used to directly heat and humidify a reactant supply stream, which can reduce or eliminate the need for conventional pre-heating and humidifying systems.

DETAILED DESCRIPTION OF THE PREFERRED EMBODIMENTS

Figure 1:
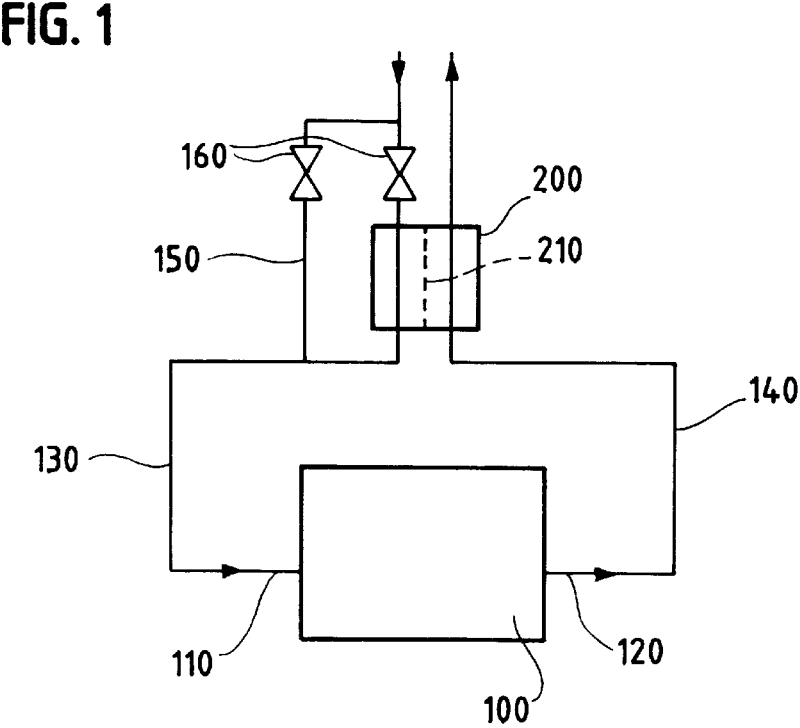
FIG. 1 is a schematic diagram illustrating an embodiment of a solid polymer fuel cell system in which an exhaust reactant stream from a fuel cell stack is used to humidify and adjust the temperature of a reactant stream supplied to the stack.

The present fuel cell system employs a solid polymer fuel cell and a combined heat and humidity exchanger (CHHE) for heating and humidifying a reactant gas supply stream. In preferred embodiments, a CHHE comprises a water permeable membrane. The supply stream flows through a CHHE on one side of the membrane and an exhaust stream from the fuel cell flows the CHHE on the other side of the membrane. While either the fuel or oxidant exhaust stream can be used in principle, the latter typically contains more water and is thus a preferred choice. (Typically the oxidant exhaust stream is saturated with water vapor and additionally contains liquid product water. Thus, while the oxidant exhaust stream is primarily a supply of water vapor, there is some liquid water present as well.) Further, while either or both of the fuel or oxidant supply stream can be heated and humidified in a CHHE, the oxidant stream is generally the selected stream. Often, the fuel supply stream is inherently humid as supplied (e.g. if generated by a reformer) and, in fact, certain fuel cell systems can operate without humidified fuel supply streams.

In a CHHE, water vapor from the hot exhaust gas is transferred across the membrane due to a difference in partial pressures of water between the two streams. Heat is also transferred. Most of the heat energy imparted to the supply stream is actually associated with the water component transferred to it from the hot exhaust stream. In addition, most of the heat associated with the water vapor in the hot exhaust stream is retained during the transfer across the membrane. Thus, most of the desired "heating" of the supply stream is actually accomplished simply by the mere exchange of warm water vapor. Of course, heat is also exchanged across the membrane itself. And, if desired, useful heat can also be obtained from the operating fuel cell via thermal contact of the CHHE with the fuel cell.

In order to obtain efficient transfer of water vapor and hence heat, certain features of CHHE construction and certain operating parameters of the system are of particular importance. The following considerations have been provided as a guide for designing and operating a fuel cell system in accordance with the invention. However, those of ordinary skill in the field will appreciate that the design of any fuel cell system involves multiply dependent parameters and it is often hard to predict what net effect a variation of one parameter will have on another. Thus, it should be expected that some experimentation will be required in order to optimize a CHHE and its operational parameters for any given fuel cell system.

Clearly, the rate of water vapor exchange will depend on the membrane material used and its thickness. While thinner membranes with higher water exchange rate characteristics are desirable, the reactant type and the desired operating temperature and pressure conditions in a CHHE will constrain to some extent the options available here. Further, it becomes impractical to consider embodiments if the required membrane surface area is excessive.

In a CHHE, there is a water vapor concentration gradient across the membrane but also between the gas flowing next to the membrane and the free stream gas. Shallow flow channels in the supply and exhaust chambers are desirable in order to reduce the time required for moisture to diffuse into, or from, the free stream gas. Herein, the diffusion time for a given chamber in a CHHE is defined as the time it takes a water molecule to diffuse over a distance equal to the depth of a flow channel in the chamber. The supply stream flow channel depth is of particular importance since the selected exhaust stream generally is a saturated oxidant exhaust stream containing some liquid water, which has a small water vapor concentration gradient therein compared to the gradient in the supply stream. Note, however, that having shallower channels in a CHHE undesirably increases the pressure drop of a stream through the channels and thus a trade-off must be made between rate of water transfer and pressure loss.

The mean time that a molecule of water spends in a given chamber in the humidity exchanger is also of particular importance to the exchange rate (the greater the time, the greater the exchange). Herein, this mean time is denoted as the residence time and is a function of the number, length, and cross-sectional area of the flow channels as well as the stream volume flow rates. While having greater length and/or width flow channels increases residence time, this inherently requires greater membrane surface areas.

Without being bound by theory, we have found that it can be preferable to select a CHHE design and system operating parameters having a specific relationship between the residence time and diffusion time. Herein, the dimensionless parameter R for a given chamber in a CHHE is defined as the ratio of residence time divided by diffusion time for a water molecule in that chamber. For a chamber comprising n channels with dimensions of 1, w, and d for channel length, width, and depth respectively, the diffusion time in that chamber is given by $d^2/D$ where D is the diffusivity of water in air (0.22 $cm^2$ / second). The flow in the chamber (volume per unit time) is generally laminar in the range of interest and is denoted by V here. The residence time in that chamber is then given by (n*1*w*d)N. R then is given by (D*n*1*w)/(V*d).

To obtain the greatest flux of water through the membrane in certain CHHEs, the ratio R for the flows in the chambers was preferably found to be between about 0.75 and 3. The water flux drops off sharply for R values below this range. Above this range, the observed flux may increase but only slightly. (Note that in FIG. 8 following, the observed flux appears to decrease slightly for R values greater than 1 over the measured range. Generally however, R can be expected to increase somewhat above values of 1. This has been observed in other situations. Again however, the increase is not as pronounced as it is below about 0.75.) However, larger R values imply greater pressure drops in the chamber channels. In turn, greater pressure drops imply a need for a higher pressure gas supply. This is generally undesirable and can be an unacceptable requirement for portable fuel cell applications operating near ambient pressures. Further, a need for a higher pressure air supply can result in a corresponding increase in the parasitic power required to compress the air. Thus, as a practical consideration, it can be desirable for the system to have R values for each flow in each chamber to be in the range of about 0.75 to 3.

An advantage of the present approach is that the exchange in a CHHE can be largely self-regulating. For instance, when the oxidant supply stream is humidified by its own exhaust, the amount of water exchanged is a function of the oxidant supply stream flow rate which in turn is generally controlled to be proportional to the fuel cell reaction rate.

Preferably, the CHHE is external to the fuel cell and is easily separable therefrom for purposes of maintenance and servicing. Further, the CHHE is preferably modular. Thus, in the event that the CHHE were to have a shorter lifetime than the stack, it can be easily replaced. Membranes in conventional applications may ultimately need replacement as a result of accumulated ionic contaminants, however, since pure fuel cell product water is all that passes through exhaust chamber of the instant CHHE, the useful life of the membrane may be extended in this regard. Further, unlike conventional liquid-cooled fuel cell systems, no de-ionizing loop is necessary in the instant system.

FIG. 1 shows schematically a solid polymer fuel cell stack 100 with a reactant gas stream inlet port 110 and reactant gas stream outlet port 120. The flow path 130 of a reactant stream supplied to fuel cell stack 100 at inlet port 110 is shown schematically, as is the flow path 140 of an exhaust reactant stream exiting the fuel cell stack 100 at port 120. In an operating fuel cell system in which the fuel cell electrochemical reaction is exothermic and produces water, the exhaust reactant stream will be warmer and have a partial pressure of water vapor higher than the supply reactant stream. The supply reactant stream and exhaust reactant stream are directed through a CHHE 200, on opposite sides of a water permeable membrane 210, preferably in a counterflow configuration as shown in FIG. 1, whereby heat and water are transferred from the exhaust reactant stream to the supply reactant stream. Preferably the supply and exhaust reactant streams directed through the CHHE 200 are both oxidant streams. However, in principle, either exhaust stream could be used to humidify either reactant gas supply stream, provided the membrane 210 is substantially impermeable to the fuel and oxidant.

An optional reactant supply bypass path 150 and valves 160 (alternatively a single 3-way valve) may be included so that the reactant stream can be supplied to the fuel cell stack without passing through the CHHE module 200. This may be advantageous, for example, prior to system shut-down when it may be beneficial to purge the stack 100 with dry oxidant gas, or periodically during operation, for example, if flooding of the electrodes occurs. Of course, the bypass path could instead be configured so that the exhaust stream bypasses the CHHE module 200.

Figure 2:
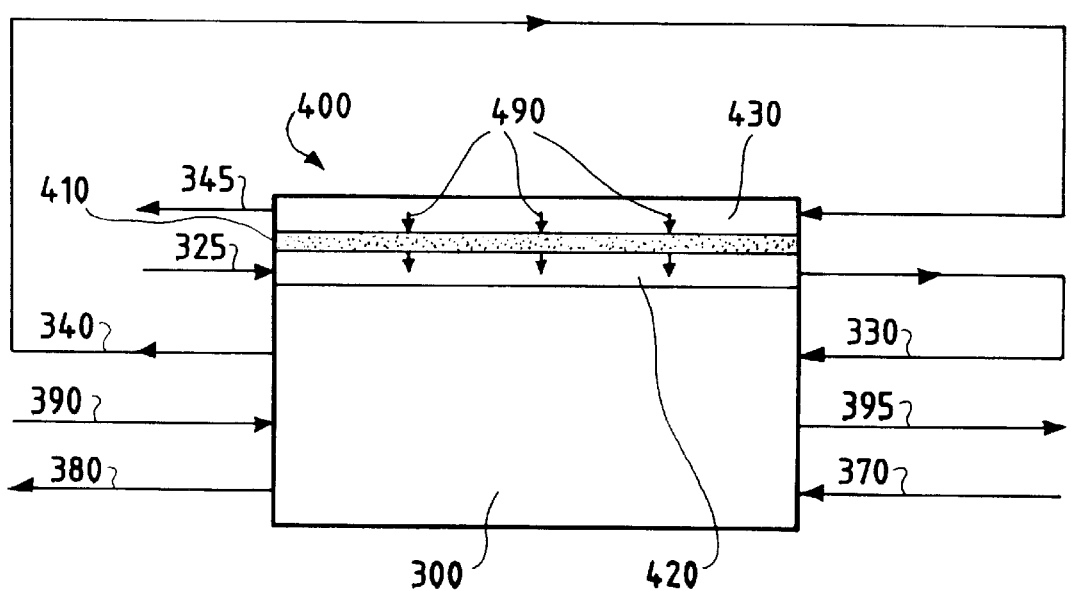
FIG. 2 is a schematic diagram illustrating the flow path of the air stream in a solid polymer fuel cell system including a solid polymer fuel cell stack in contact with an embodiment of a modular combined heat and humidity exchanger (CHHE).

In schematic FIG. 2, a solid polymer fuel cell stack 300 is shown in contact with a CHHE module 400. A membrane 410 divides CHHE module 400 reactant gas supply and exhaust chambers 420 and 430. CHHE membrane 410 is made from a material which is thermally conductive and water permeable but substantially gas impermeable. Suitable membrane materials include cellophane or perfluorosulfonic acid membranes such as NAFION® perfluorosulfonic acid membrane, which allow the passage of water vapor but are substantially impermeable to oxygen and hydrogen.

An air supply conduit 325 is connected to the reactant gas supply chamber 420 of the CHHE module 400. The air supply is directed through the reactant gas supply chamber 420 of the CHHE module 400, from which it is directed to the fuel cell stack 300 via an air inlet conduit 330. After the air has completed its passage through fuel cell stack 300, it is directed via air outlet conduit 340 to the exhaust chamber 430 of the CHHE module 400, exiting the exhaust chamber via air exhaust conduit 345.

In an operating fuel cell system in which the fuel cell electrochemical reaction is exothermic and produces water, the exhaust air stream will be warmer and have a higher partial pressure of water than the supply air stream. Thus, when the air supply and exhaust streams are directed through reactant gas supply and exhaust chambers 420, 430 respectively, the supply and exhaust streams are in contact with opposite sides of membrane 410 (preferably in a substantially counterflow configuration as indicated in FIG. 2). Heat and water are transferred from the exhaust air stream to the supply air stream as indicated by the arrows numbered 490. The product water is thus used to humidify the air supply stream, therefor no additional source of purified water is required in the fuel cell system for this purpose. This is particularly advantageous in air-cooled fuel cell systems, or systems in which water is not provided for cooling or other functions.

CHHE module 400 may be placed in direct thermal contact with fuel cell stack 300 so that, in operation, heat emanating from fuel cell stack 300 contributes to heating the air supply stream passing through CHHE module 400. In this regard, preferably the reactant gas supply chamber 420, through which the cooler air supply stream is directed, is placed closer to the stack 300. It is advantageous that the stack and the exhaust air stream which are used to heat the air supply stream are at the stack operating temperature, as it is desirable to bring the temperature of the air supply stream as close as possible to the stack operating temperature.

The flow passages through the two chambers 420 and 430 can be configured and designed to enhance the transfer of heat and water vapor from the oxidant exhaust stream to the oxidant supply stream, and thereby improve the efficiency and effectiveness of CHHE module 400. In one embodiment of the invention, the CHHE module 400 may use a plurality of parallel flow channels in the two chambers 420 and 430. To reduce the overall length of CHHE module 400, the channels may be configured in a serpentine pattern. One type of serpentine pattern is defined as a flow pattern where the direction of the flow reverses 180 degrees between parallel channels divided by a common channel wall.

Generally there is a temperature gradient in an operating fuel cell stack. A coolant supply conduit 390 and coolant outlet conduit 395 for directing a coolant fluid through the stack 300 are illustrated in FIG. 2. Often the stack temperature will increase in the coolant flow direction. It can be advantageous to orient the CHHE module 400 on the stack 300 so that the supply reactant air is directed through the reactant gas supply chamber 420 from a region of the chamber located closer to a cooler portion of the stack 300, to a region located closer to a warmer portion of the stack 300. Correspondingly, the exhaust reactant air is preferably directed through the secondary chamber 430 from a region of the chamber located closer to a warmer portion of the stack 300, to a region located closer to a cooler portion of the stack 300.

A fuel stream supply conduit 370 and fuel stream outlet conduit 380 for directing a fuel stream to and from the stack 300 are also illustrated in FIG. 2.

Figure 3:
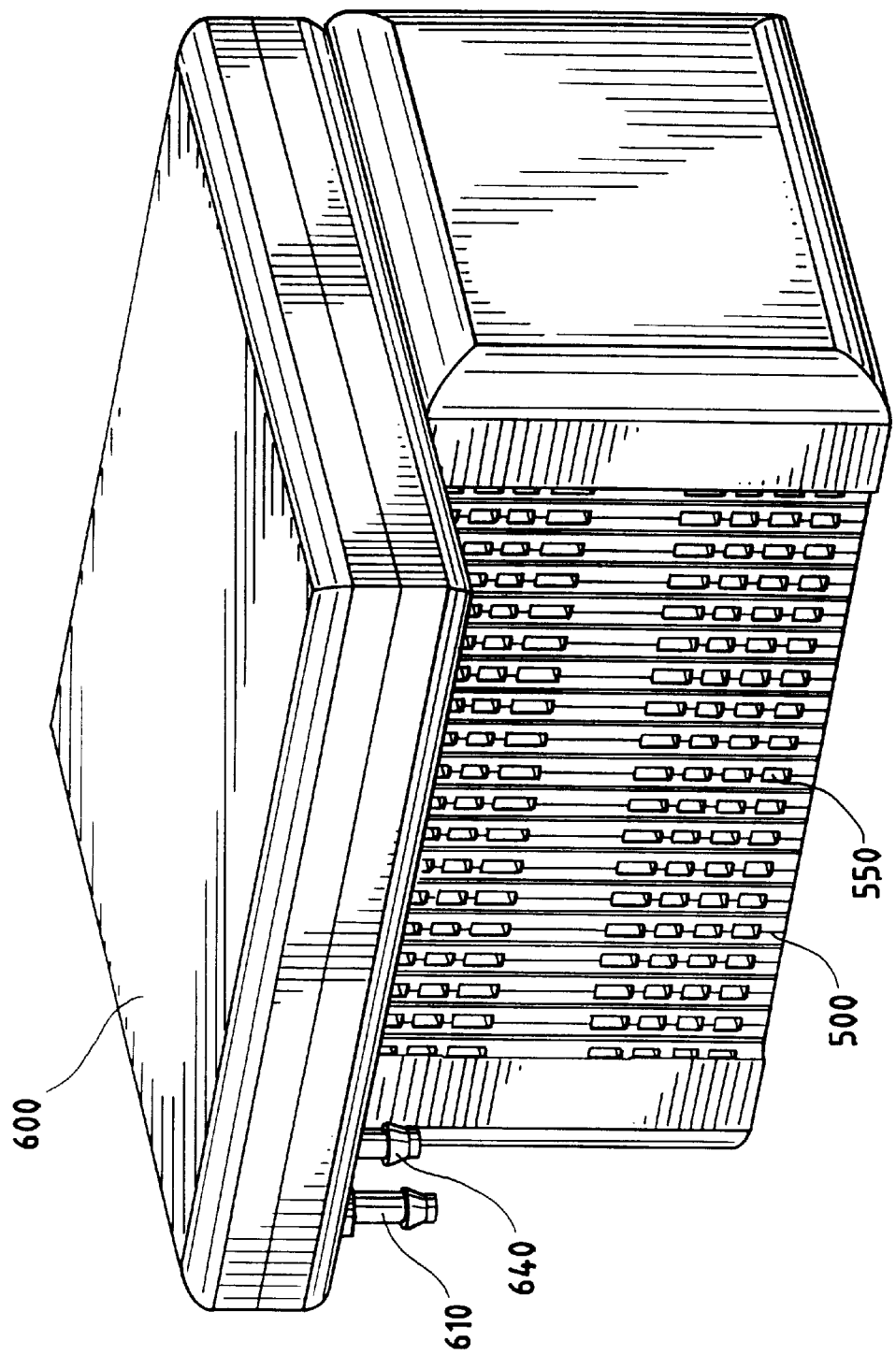
FIG. 3 is a perspective view of a solid polymer fuel cell stack in contact with an embodiment of a modular CHHE.
Figure 4:
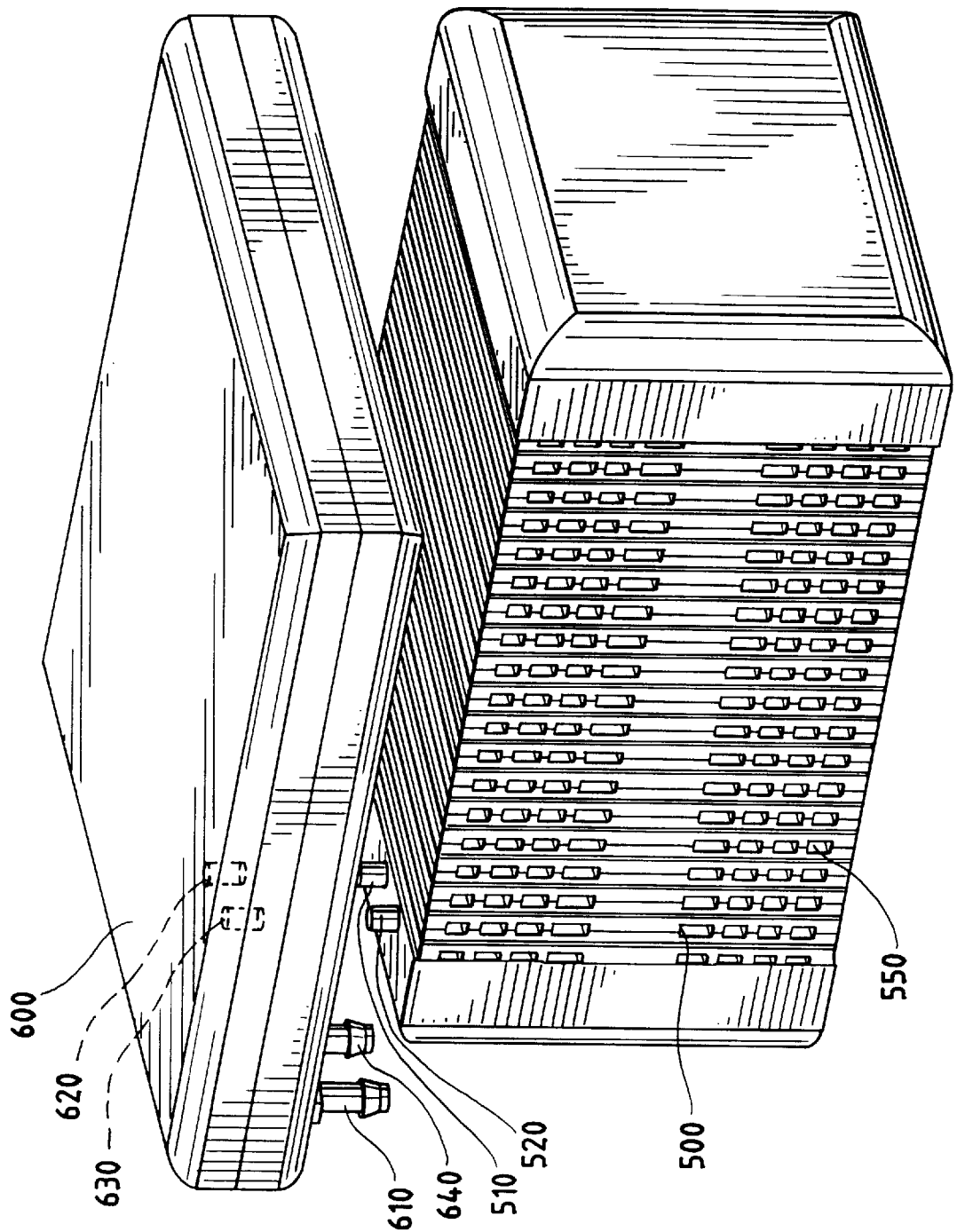
FIG. 4 is an exploded perspective view illustrating the fluid stream inlet and outlet port connections between the stack and the modular CHHE of FIG. 3.

FIGS. 3 and 4 illustrate an air-cooled fuel cell system comprising a CHHE. A plate-and-frame type CHHE module 600 is located in direct thermal contact with fuel cell stack 500. An air stream enters the reactant gas supply (lower) chamber of CHHE module 600 through CHHE air supply inlet port 610. FIG. 4 shows how fuel cell air supply inlet port 510 on fuel cell stack 500 is connected to CHHE air supply outlet port 620 of CHHE module 600, to receive humidified and pre-heated air from CHHE module 600. Fuel cell exhaust air exits stack 500 at fuel cell outlet port 520 which is connected to exhaust inlet port 630 of the CHHE module. Warm, exhaust air is directed through exhaust (upper) chamber of CHHE module 600 exiting at CHHE exhaust outlet port 640. In operation, cooling air is directed through channels 550 which extend between opposite faces of stack 500.

Many different membrane exchange humidifier constructions can be used for a CHHE. The following are illustrative of some of the possible choices.

1) Plate-and-frame

Figure 5:
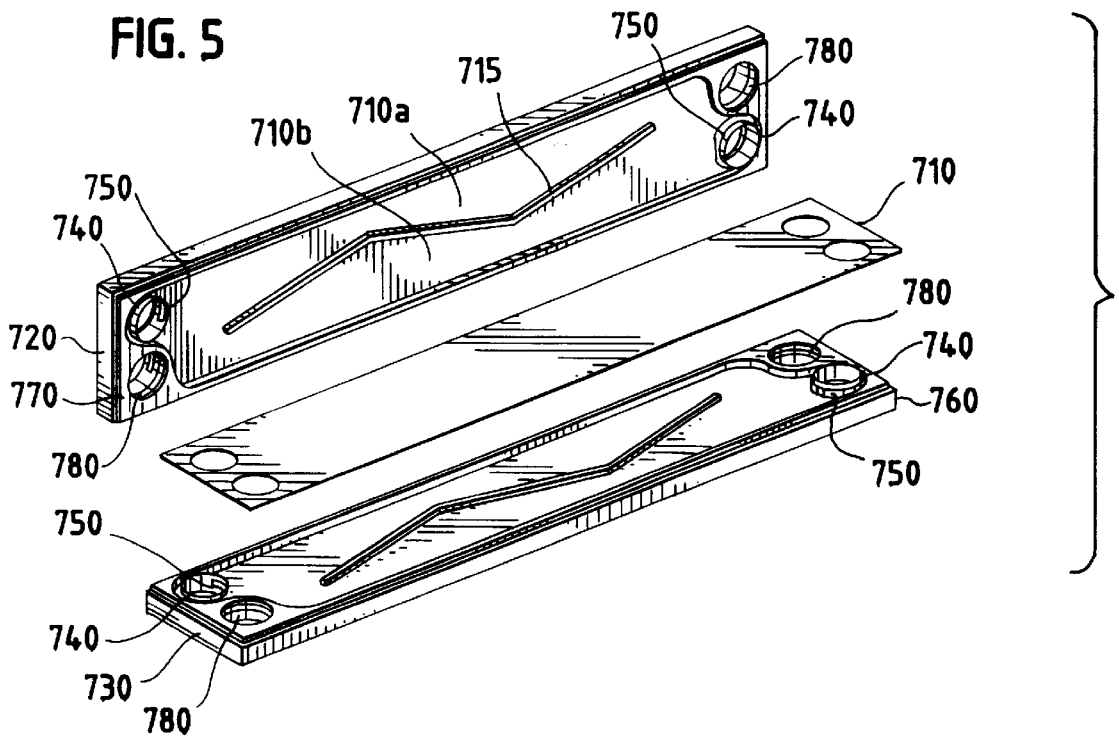
FIG. 5 is an exploded perspective view of a single plate-and-frame membrane exchange assembly which can optionally be used to construct a multiple plate-and-frame CHHE stack.

FIG. 5 depicts an exploded view of a single plate-and-frame membrane exchange assembly which can optionally be used to construct a multiple plate-and-frame CHHE stack. Water permeable membrane layer 710 is interposed between resilient plate 720 and resilient plate 730. Plates 720 and 730 contain openings which are aligned with openings in membrane layer 710. When these components are stacked one on top of the other, the openings form internal fluid manifolds for supplying and exhausting fluid streams to and from plates 720 and 730. Manifolds 740 and sealing ridges 780 may be molded into plates 720 and 730 around the openings as shown such that each manifold 740 seals against a corresponding sealing ridge 780 when assembled. Manifold ports 750 in the manifolds 740 allow the fluids to enter the fluid passages on the plate surfaces and vice versa. Continuous sealing depression 760 and sealing ridge 770 circumscribe the perimeters of a major surface of plate 730 and 720 respectively. Membrane layer 710 is pressed and sealed between sealing ridge 770 and sealing depression 760 when assembled. A compression mechanism (not shown in this Figure) is used to maintain a compressive load on the components of the plate-and-frame assembly in order to provide fluid tight sealing.

The fluid passages formed in the major surfaces of plates 720 and 730 may be arranged as separate channels to more evenly distribute the respective fluid streams to the entire exposed surface of membrane layer 710. For example, FIG. 5 shows plate 720 with its major surface divided into two parallel channels 710*a* and 710*b* by divider rib 715. Divider rib 715 is pressed against the thin membrane layer 710 to reduce the potential for causing damage thereto. It is believed that use of non-linear and non-aligned divider ribs can reduce the shear forces applied to the thin membrane layer when the components are compressed. Thus, divider rib 715 may be provided with shallow bends in alternating directions as shown in FIG. 5. And, the shallow bends in the divider rib 715 of plate 720 can be opposite to the direction of the shallow bends of plate 730 such that divider ribs on each plate are not generally aligned.

2) Multiple plate-and-frame stack

The plate-and-frame assembly illustrated in FIG. 5 may be stacked with other plate-and-frame assemblies to increase its capacity by increasing the membrane surface area which is exposed to the fluid streams. For instance, in FIG. 5, fluid channels 710*a* and 710*b* may be suitably formed on both sides of plates 720 and 730 so that fluid streams may be directed to both major surfaces of the plates, thereby doubling the membrane area per plate. A plurality of plates may then be stacked one on top of the other with membrane layers and inserts interposed therebetween in order to make a multiple plate-and-frame CHHE stack.

Figure 6:
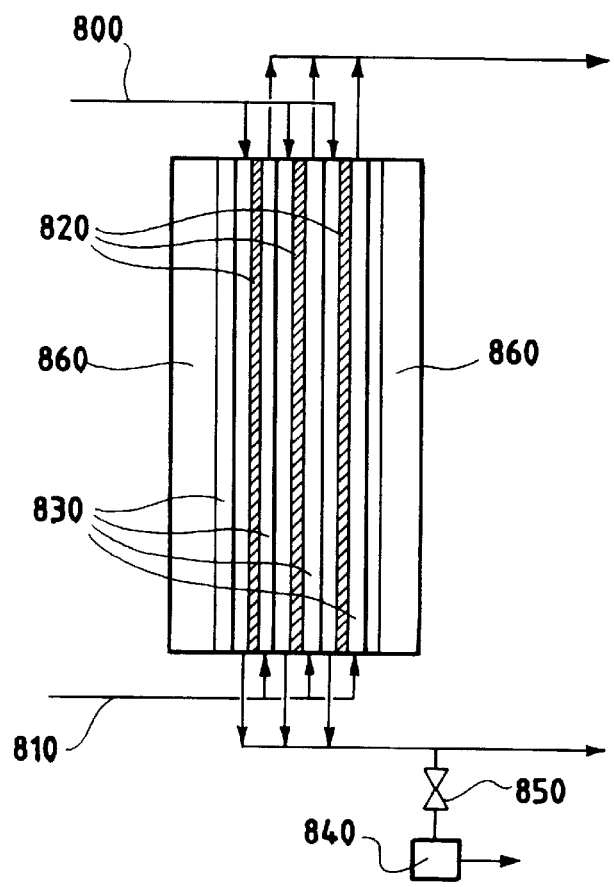
FIG. 6 is a schematic illustration of a CHHE comprising a stack of multiple plate-and-frame assemblies, the CHHE employing three membrane layers and resilient separator plates with different fluids supplied to opposite sides of the plates.

FIG. 6 schematically shows a possible stack arrangement and flow pattern for such a CHHE. Therein, exhaust and supply streams 800 and 810 are supplied to a CHHE comprising a stack of plate-and-frame assemblies and three membrane layers 820 interposed between four plates 830. Membrane layers 820 and plates 830 are shown in end view (i.e. the major surfaces of these components are not shown). A solid line in the middle of plates 830 represents how plates 830 are divided into two halves with different fluid streams flowing on opposite sides of plates 830. Streams 800 and 810 are directed to respective fluid channels formed in the major surfaces of plates 830. Streams 800 and 810 are separated by plates 830 and membrane layers 820. The fluid channels may be vertically oriented as illustrated, with exhaust stream 800 entering the plate-and-frame assembly from the top and flowing downwards and supply stream 810 entering from the bottom and flowing upwards. Accordingly, in FIG. 6, exhaust and supply streams 800 and 810 flow in generally opposite directions.

A drain 840 may be provided for recovering condensed water from the exhaust stream. Drain 840 is sealed to prevent gaseous components from exiting through the drain. Liquid water recovered by drain 840 may be used for other purposes. The stack of plate-and-frame assemblies are interposed between two compression plates 860.

3) Tubular bundle

In principle, a tubular bundle construction can be used in a CHHE. Such constructions comprise a bundle of membrane tubes or pipes that have been surrounded by sealant at the ends and then are encased in a shell. One of the supply and exhaust gas streams is then directed through the membrane tubes while the other gas stream is directed around the membrane tubes within the shell. Such constructions are commercially available. For instance, gas dryers using NAFION® perfluorosulfonic acid membrane tubes are available from Permapure™. NAFION® perfluorosulfonic acid membrane however is not dimensionally stable with respect to temperature and humidity variations and thus NAFION® perfluorosulfonic acid membrane may not be a preferred membrane material in such constructions. More dimensionally stable membranes may therefore be. Further, commercially available gas dryers typically employ narrow bore tubes (<1 mm). In many fuel cell system applications, the pressure drops resulting from the typical flow through such narrow bore tubes would be too high and may be unsuitable particularly for systems employing near ambient pressure air. However, tubular bundles employing larger bore tubes may be suitable. And, conventional narrow bore tubular bundles may be suitable in systems where larger pressure drops are not so important.

4) Jelly roll

A membrane-based CHHE can also have a jelly roll type of construction. An exemplary construction uses a suitable water permeable membrane sheet which is sandwiched between two layers of gas permeable, open cell foam which are in turn sandwiched between two gas impermeable sheets. Seals are provided at the edges between the membrane and each gas impermeable sheet (e.g. using bands of gas impermeable closed cell foam). Thus, chambers for the CHHE are defined by each edge-sealed gas impermeable sheet. Gas inlets and outlets for the supply and exhaust gas streams are provided at suitable locations in the seals and the sheet sandwich is rolled up into a jelly roll. The jelly roll is then placed in a housing and appropriate connections are made to the gas inlets and outlets to complete the assembly.

The jelly roll construction results in a compact CHHE with relatively high membrane surface area. However, as in the tubular bundle construction, it is preferable to use a dimensionally stable membrane, otherwise it can be difficult to obtain satisfactory sealing to the membrane.

In an alternative approach, CHHEs comprising water adsorbent materials rather than water permeable membranes can be used. In principle, water and heat can be extracted from an exhaust stream of a fuel cell by passing the exhaust stream over a suitably selected, high surface area, water adsorbent material. Water and heat from the exhaust stream can then be introduced into a reactant gas supply stream by now passing the supply stream over the water adsorbent material, whereupon the water desorbs into the supply stream. The flows of the exhaust and supply streams in such a device alternate over a bed of water adsorbent material.

One possible construction of such a device comprises two beds of water adsorbent material in separate housings. At any given time, the exhaust and supply streams flow through different beds. Periodically though, an automated flow control system is used to switch the flow of each stream over to the other respective bed. Thus, each bed is alternately exposed to the exhaust and supply streams.

Figure 7:
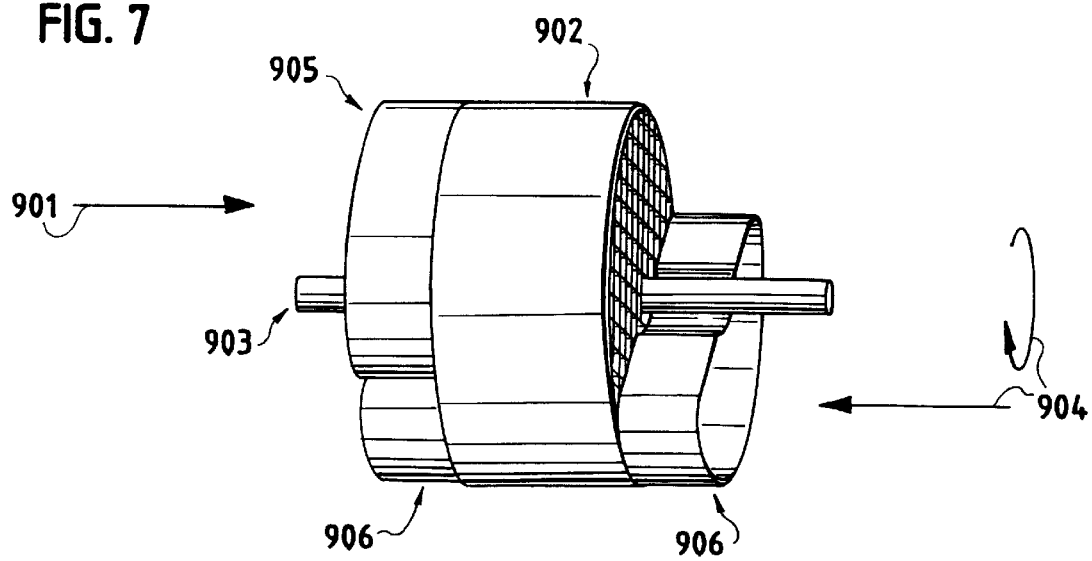
FIG. 7 shows an illustration of an alternative CHHE based on water adsorption/desorption principles rather than water permeable membranes for purposes of heat and humidity transfer.

FIG. 7 shows another example of such a device which uses a revolving wheel filled with suitable water adsorbent material. Therein, filled revolving wheel 902 revolves on axle 903. Exhaust stream 901 (flow direction is indicated with an arrow) is directed through an upper portion of the revolving wheel 902. Supply stream 904 (the preferred counterflow direction is indicated with an arrow) is directed through a lower portion of the revolving wheel 902. Dynamic gas sealing of the exhaust and supply streams is made by conventional couplings 905 and 906 respectively (one exhaust coupling not shown in FIG. 7).

The following examples have been included to illustrate different embodiments and aspects of the invention but these should not be construed as limiting in any way.

EXAMPLE 1

An air-cooled solid polymer fuel cell system was assembled. The hydrogen fuel supply was not humidified nor heated. However, the oxidant supply was humidified and heated prior to entering the fuel cell stack. The exhaust oxidant stream was employed as the hot, wet stream in the combined heat and humidity exchanger (CHHE) used to heat and humidify the oxidant supply.

The CHHE was modular and of a single membrane, dual serpentine channel, countercurrent flow, plate-and-frame type of construction as shown in FIGS. 2 to 4. That is, there was only one supply and one exhaust flow field plate on each side of the water permeable membrane. Each of the supply and oxidant flows were split into two flow channels (dual channels) and traversed a serpentine path inside the CHHE module. The wall separating each pair of flow channels served as a membrane supporting rib.

A perfluorosulfonic acid membrane sold under the trademark NAFION 117® (equivalent weight 1100, thickness 7 mils) was used as the membrane. The active area (i.e. area available for water transport which doesn't include the area masked by the supporting ribs) of the membrane was about 90 cm$^2$ (14 in$^2$). The length, width, and depth of the flow channels were about 60, 0.78 and 0.25 cm (22, 0.31, and 0.1 inches) respectively.

The fuel cell stack was sized to provide 100 W of power. Dry hydrogen was used as the fuel supply at a flow rate which matched consumption. The oxidant supplied was ambient air (approximately 20° C. and with a 10° C. dewpoint) at a flow rate of 6 L/minute at a power rating of 95 W. The flow rate of the oxidant exiting the fuel cell stack and entering the CHHE was about 5.4 L/minute as a result of the consumption of oxygen in the fuel cell reaction (supply/exhaust air volume ratios of about 0.9 are typical for fuel cell operation wherein twice as much oxygen enters than is required by the fuel cell reaction).

The oxidant exhaust entering the CHHE was at about 65° C. in temperature. The oxidant exhaust comprised sufficient water in both the liquid and gas phase to have a dewpoint of about 69° C. The heated, humidified oxidant supply stream was measured to be at 53° C. and to have a dewpoint of 51° C. upon exiting the CHHE. Thus, the oxidant supply had been substantially heated and humidified.

Under these conditions, the air-cooled portable fuel cell system was able to deliver 100 watts for over 1000 hours with no deterioration in performance whereupon testing was stopped. The CHHE therefore appeared to adequately heat and humidify the oxidant stream for practical operation of the fuel cell.

Figure 8:
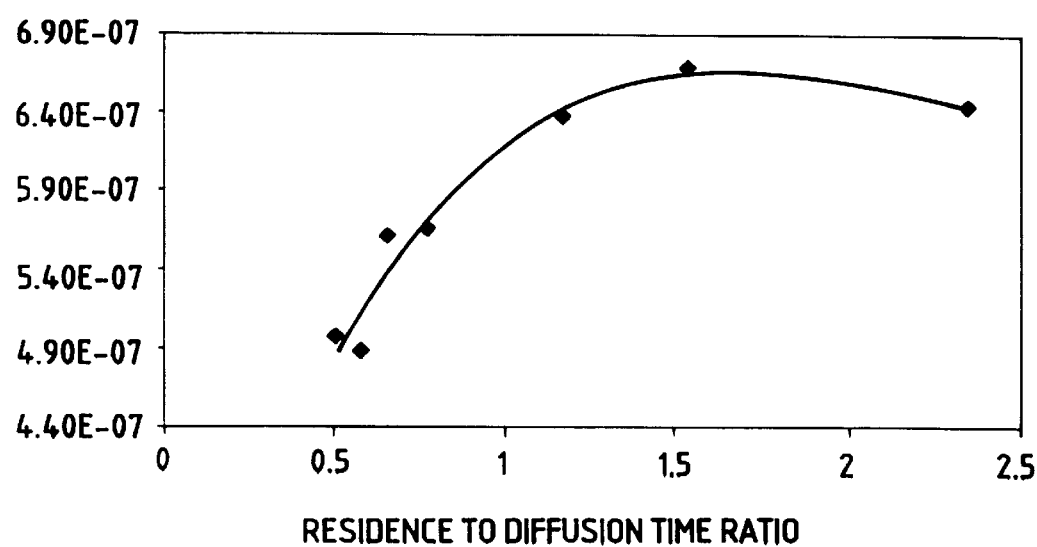
FIG. 8 shows a plot of the normalized flux versus residence to diffusion time ratio data for a CHHE of Example 1.

The residence to diffusion time ratio, R, for water in the supply chamber of this CHHE under the above conditions is calculated to be about 0.76. R for water in the exhaust chamber is calculated to be about 0.84. In a laboratory test station, the performance of this CHHE was further quantified under different conditions. By varying the flow rate of the oxidant stream, the residence time could be varied at constant channel depth (and hence constant diffusion time). FIG. 8 shows a plot of the observed normalized flux through the membrane in this CHHE versus the varied residence to diffusion time ratio in the exhaust chamber. (Normalized flux values were obtained by dividing the observed water flux rate by the mean velocity of the oxidant exhaust stream.) The normalized flux is seen to increase significantly as R increases up to a value of about 1. For higher values of R, the normalized flux does not increase significantly.

EXAMPLE 2

In the CHHE of Example 1, it was confirmed that the pressure drop was relatively small in the flow fields themselves (compared to pressure drops elsewhere in the system). As a result, the flow channel depth could be reduced somewhat, thereby undesirably increasing the pressure drop slightly but desirably increasing the efficiency of the water transport. In this Example, a CHHE was therefore employed with shallower flow channels than Example 1. The modular CHHE employed a single membrane, multiple straight flow channels, countercurrent flow, and a plate and frame type of construction. Here, each of the supply and oxidant flows were split into 25 straight flow channels inside the CHHE module. The walls separating the multiple flow channels served as membrane supporting ribs.

Again, A perfluorosulfonic acid membrane sold under the trademark NAFION 117® was used as the membrane and the active area was about 80 cm$^2$ (11 in$^2$). The length, width, and depth of the flow channels were about 2.6 (although several channels were shortened for other design reasons), 0.14–0.15, and about 0.02 inches respectively (6.6, 0.36–0.38, and 0.05 cm, respectively).

The characteristics of the oxidant exhaust entering the CHHE were about the same as in Example 1. However, the heated, humidified oxidant supply stream at the outlet of the CHHE was about 1° C. higher in both temperature and dewpoint. Thus, the heating and humidification of the oxidant supply had been improved. The residence to diffusion time ratio, R, for water in the supply chamber of this CHHE under the above conditions is calculated to be about 2.6. R for water in the exhaust chamber is calculated to be about 2.9.

Again, under these conditions, the air cooled fuel cell system was able to deliver 100 watts for over 2000 hours with no deterioration in performance whereupon testing stopped. This CHHE also appeared to adequately heat and humidify the oxidant stream for practical operation of the fuel cell.

EXAMPLE 3

An air-cooled solid polymer fuel cell system was assembled as in Example 1 except that the modular CHHE employed a multiple membrane, multiple essentially straight flow channels, countercurrent flow, and a multiple plate-and-frame type of construction as shown in FIG. 6. That is, there were multiple (45) supply and exhaust flow field plates stacked between multiple membranes respectively and manifolded together appropriately. Additionally, each of the supply and oxidant flows in a given plate were split into multiple, essentially straight, flow channels. Again, the walls separating the flow channels served as membrane supporting ribs.

A perfluorosulfonic acid membrane sold under the trademark NAFION 117® was again used as the membrane. The active area of each membrane was about 50 cm$^2$ (7.7 in$^2$). The length, width, and depth of the flow channels were about 15.8, 0.5, and 0.2 cm respectively (6.2, 0.2, and 0.08 inches respectively). Overall there were 4 channels per stream.

The fuel cell stack was sized to provide 1500 W of power. Dry hydrogen was used as the fuel supply at a flow rate to match consumption. The oxidant supplied was ambient air (approximately 20° C. and 10° C. dewpoint) at a flow rate of 90 L/minute. The flow rate of the oxidant exiting the fuel cell stack and entering the CHHE was about 80 L/minute as a result of the consumption of oxygen in the fuel cell reaction.

The residence to diffusion time ratio, R, for water in the supply chamber of this CHHE under the above conditions is calculated to be about 1. R for water in the exhaust chamber is calculated to be about 1.2.

The air-cooled fuel cell system was able to deliver 1500 watts and lifetime testing is in progress. So far, the CHHE appears to adequately heat and humidify the oxidant stream for practical operation of the fuel cell. Further, only about 3% of the generated power was needed to run the fuel cell system (parasitic power). Thus, the system showed a very high efficiency.

EXAMPLE 4

A liquid water-cooled solid polymer fuel cell system comprising 25 kW fuel cell stack modules was constructed so as to deliver approximately 75 kW of power (suitable for use in a small automobile). Reformed methanol was used as the fuel supply stream and was thus inherently humid. Dry compressed air was used as the source of oxidant gas. In conventional operation, the compressed air was humidified prior to entering the fuel cell by first flowing it through a cross-flow membrane humidifier (i.e. the two streams flow perpendicular to one another). Warm liquid water from the liquid cooling system was used as the wet stream in the membrane humidifier. This arrangement provided for adequate humidification and heating of the oxidant supply stream.

In accordance with the present approach, an experiment was performed using a similar membrane humidifier but sized for a 25 kW fuel cell system. A simulated oxidant exhaust stream from a 25 kW fuel cell stack module was connected to the scaled membrane humidifier in place of a warm liquid water stream. The oxidant supply stream was now humidified to about a 45° C. dewpoint. While not quite adequate for the specific automotive application, the oxidant supply stream had nonetheless been substantially humidified using the exhaust stream in a conventional membrane humidifier. Thus, there is an expectation that a membrane humidifier would be adequate if optimized for operation using the oxidant exhaust (e.g. by module sizing, selection of more permeable membrane, or reduced humidity requirements).

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. A method for heating and humidifying a reactant gas supply stream for a solid polymer fuel cell, the reactant gas supply stream being directed to a reactant gas inlet port of the fuel cell, and the fuel cell having a reactant gas exhaust stream directed from a reactant gas exhaust port of the fuel cell, the method consisting essentially of:

a) providing a combined heat and humidity exchanger comprising a supply stream chamber, an exhaust stream chamber, and a water permeable membrane separating the two chambers;

b) directing the reactant gas supply stream through the supply stream chamber upstream of the fuel cell reactant gas inlet port; and c) directing the reactant gas exhaust stream from the reactant gas exhaust port through the exhaust stream chamber;

whereby water and heat are transferred from the reactant gas exhaust stream to the reactant gas supply stream across the water permeable membrane.

2. The method of claim 1 wherein the reactant gas supply stream is an oxidant supply stream and the reactant gas exhaust stream is selected from the group consisting of an oxidant exhaust stream and a fuel exhaust stream.

3. The method of claim 2 wherein the oxidant supply stream at said inlet port is at a pressure below about 300 mbar.

4. The method of claim 1 wherein the reactant gas exhaust stream is an oxidant exhaust stream and the reactant gas supply stream is selected from the group consisting of an oxidant supply stream and a fuel supply stream.

5. The method of claim 4 wherein the reactant gas supply stream is an oxidant supply stream.

6. The method of claim 5 wherein the flow rate of the oxidant supply stream is in the range of from about 6 to 90 L/minute.

7. The method of claim 1 wherein the reactant gas supply stream and the reactant exhaust stream are directed through the combined heat and humidity exchanger in a counterflow configuration.

8. The method of claim 1 wherein the flow rate of the reactant gas supply stream through the supply stream chamber is selected such that the residence to diffusion time ratio, R, for a water molecule in the supply stream chamber is in the range from about 0.75 to 3.

9. The method of claim 1 wherein the flow rate of the reactant gas exhaust stream through the exhaust stream chamber is selected such that the residence to diffusion time ratio, R, for a water molecule in the exhaust stream chamber is in the range from about 0.75 to 3.

10. The method of claim 1 wherein the solid polymer fuel cell is essentially air-cooled.

\* \* \* \* \*